(12) United States Patent
Elwell

(10) Patent No.: US 7,213,853 B2
(45) Date of Patent: May 8, 2007

(54) METHOD AND APPARATUS FOR APPLYING A DECORATIVE DESIGN TO A DOOR HANDLE OVERLAY

(75) Inventor: James P. Elwell, Johnston, IA (US)

(73) Assignee: Putco, Inc., Story City, IA (US)

( * ) Notice: Subject to any disclaimer, the term of this patent is extended or adjusted under 35 U.S.C. 154(b) by 0 days.

(21) Appl. No.: 11/011,347

(22) Filed: Dec. 14, 2004

(65) Prior Publication Data

US 2006/0125262 A1    Jun. 15, 2006

(51) Int. Cl.
*B60R 13/04* (2006.01)

(52) U.S. Cl. .................... 296/1.08; 296/21; 40/591

(58) Field of Classification Search ........... 296/1.08, 296/21; D8/322; D12/78, 190, 195, 196; 40/590, 597
See application file for complete search history.

(56) References Cited

U.S. PATENT DOCUMENTS

| | | | | |
|---|---|---|---|---|
| 3,869,332 | A * | 3/1975 | Loew ............... | 428/31 |
| 4,825,673 | A * | 5/1989 | Drake ............... | 70/455 |
| 5,088,781 | A * | 2/1992 | Ono et al. ........ | 292/347 |
| 5,985,382 | A * | 11/1999 | Shuen .............. | 428/31 |
| 6,106,912 | A * | 8/2000 | Balog .............. | 428/31 |
| 6,217,958 | B1 * | 4/2001 | Blyden et al. ..... | 428/31 |
| 6,231,104 | B1 * | 5/2001 | Roethel ............ | 296/78.1 |
| 6,295,945 | B1 * | 10/2001 | Amanze ............ | 116/173 |
| 6,412,145 | B1 * | 7/2002 | Rubel .............. | 16/412 |
| 6,463,686 | B1 * | 10/2002 | Eisenbraun ........ | 40/591 |
| 6,484,427 | B1 * | 11/2002 | Santa Cruz et al. . | 40/591 |
| 6,553,697 | B1 * | 4/2003 | Pichan ............. | 40/591 |
| 6,592,240 | B2 * | 7/2003 | Camarota et al. ... | 362/399 |
| 6,626,473 | B1 * | 9/2003 | Klein et al. ....... | 292/347 |
| 6,740,834 | B2 * | 5/2004 | Sueyoshi et al. ... | 200/600 |
| 6,749,250 | B1 * | 6/2004 | Reid ............... | 296/136.07 |
| 6,789,833 | B1 * | 9/2004 | Alber .............. | 296/57.1 |
| 6,929,294 | B2 * | 8/2005 | Byrla et al. ....... | 292/336.3 |
| 2002/0021459 | A1 * | 2/2002 | McAbee ........... | 359/1 |
| 2003/0122357 | A1 * | 7/2003 | Rhue .............. | 280/770 |
| 2003/0122556 | A1 * | 7/2003 | Sueyoshi et al. ... | 324/686 |
| 2004/0134108 | A1 * | 7/2004 | Harari ............. | 40/600 |

* cited by examiner

*Primary Examiner*—D. Glenn Dayoan
*Assistant Examiner*—Greg Blankenship
(74) *Attorney, Agent, or Firm*—McKee, Voorhees & Sease, P.L.C.

(57) ABSTRACT

The current invention relates to a handle overlay configured to an existing vehicle door handle and a decorative design member affixed to the handle overlay. In addition, the decorative design member can be integrated into a handle overlay for the current invention. The invention also relates to a method for applying a cover to a vehicle door handle comprising the steps of taking a decorative design member and affixing the decorative design member to a handle overlay, wherein the handle overlay is configured to affix to a vehicle door handle and then affixing the handle overlay to a vehicle door handle.

14 Claims, 4 Drawing Sheets

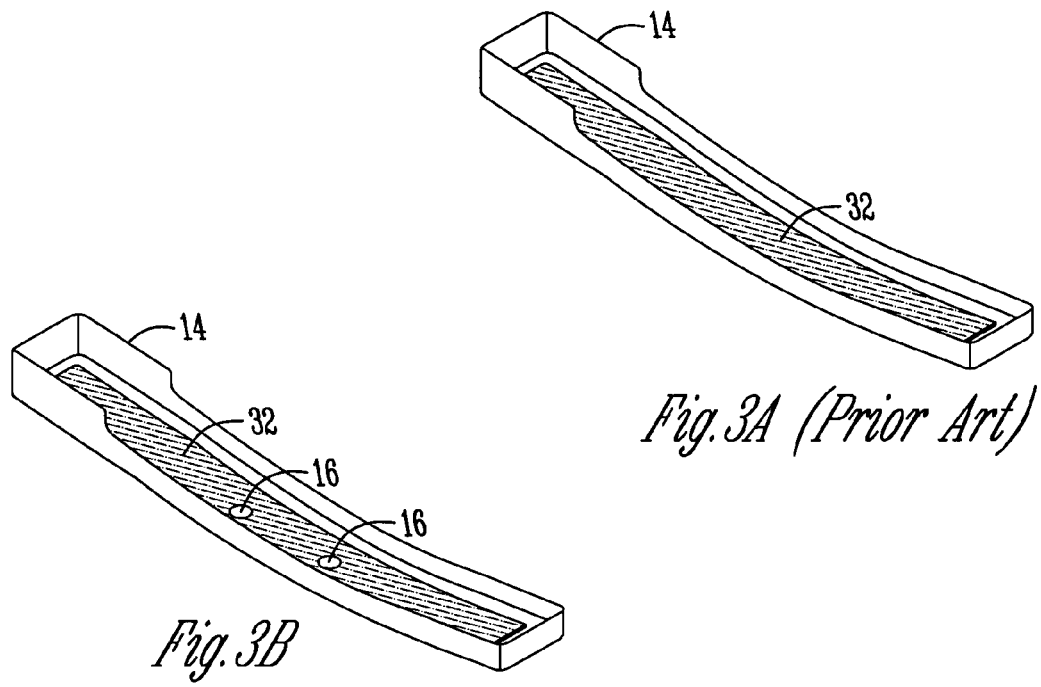
Fig. 3A (Prior Art)
Fig. 3B
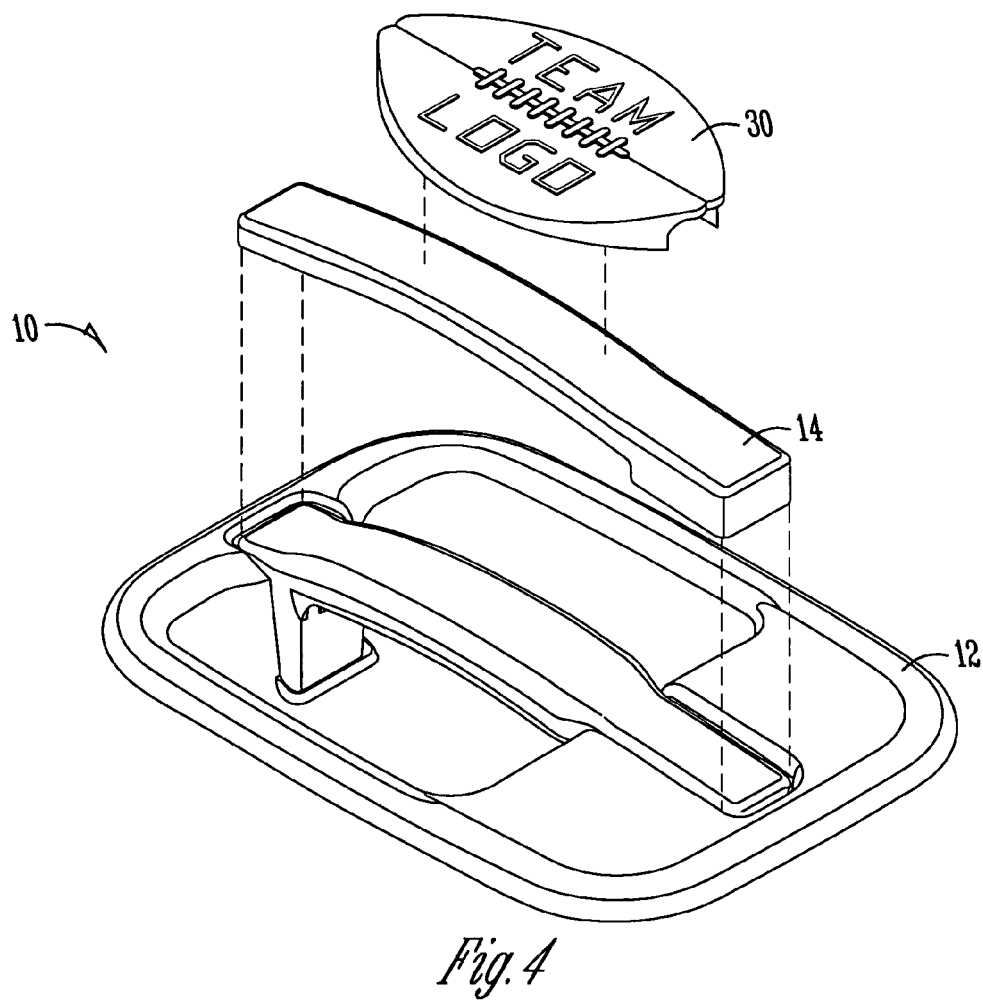
Fig. 4

METHOD AND APPARATUS FOR APPLYING A DECORATIVE DESIGN TO A DOOR HANDLE OVERLAY

BACKGROUND OF THE INVENTION

This invention relates to after market trim devices for automobiles. Specifically, the invention relates to a method and apparatus for applying a decorative design to a door handle overlay.

After market trim devices for automobiles are basically trim pieces which can be added to an automobile to add decoration and customization to a vehicle beyond what is supplied by the vehicle manufacturer. Today it is common to add after market trim pieces to vehicle door handles 12 such as the vehicle door assembly 10 shown in FIG. 1. To apply after market trim to such a door handle 12, one simply takes a handle overlay 14 as is shown in FIG. 2 and applies it to the door handle 12. This can be accomplished when the handle overlay 14 is manufactured to fit onto specific door handles 12 with a tight fit and with the use of double-sided tape inside the handle overlay 14 which when pressed tightly with the handle 12, sticks the handle overlay 14 to the handle 12. The double-sided tape 32 can be seen on the backside of the handle overlay 14 in FIG. 3A.

This type of handle overlay 14 is usually chromed or colored in a plain fashion. However, some customizers of the vehicles may wish to add more decoration and design to their vehicles. Therefore, it is desirable to have a method and apparatus for applying more decoration to the vehicle handle overlays so that one can further customize one's vehicle.

The primary objective of the present invention is to provide an improved method and apparatus for applying a decorative design member to a door handle.

Another object of the present invention is to allow individuals to easily customize their vehicle by adding after market decorative designs as trim on their vehicles.

A further object is a provision of the method and apparatus for applying a decorative design member to a door handle which is economical to manufacture, durable in use, and efficient in operation.

One or more of these or other objects of the invention will be apparent from the specification and claims that follow.

SUMMARY OF THE INVENTION

The foregoing objects may be achieved by a vehicle handle cover comprising a handle overlay configured to affix to an existing vehicle door handle and a decorative design member affixed to the handle overlay.

A further feature of the present invention involves a vehicle handle cover comprising a handle overlay wherein the decorative design member is a logo.

A further feature of the present invention involves a vehicle handle cover comprising a handle overlay wherein a decorative design member is integral with the handle overlay.

A further feature of the present invention involves a vehicle handle cover wherein a handle overlay is affixed to an existing vehicle door handle by a connecting member selected from the group essentially consisting of double-sided tape, adhesive, glue, bonding agent, cured resin, fusing, welding, screws, bolts, pins, and rivets.

A further feature of the present invention involves a vehicle handle cover wherein a decorative design member is affixed to a handle overlay by a connecting member selected from the group consisting of double-sided tape, adhesive, glue, bonding agent, cured resin, fusing, welding, screws, bolts, pins, and rivets.

A further feature of the present invention involves a vehicle handle cover configured to affix to a vehicle door handle which is part of a vehicle, the part selected from the group consisting essentially of a door, a trunk, a tailgate, a hatch, a hood, a storage box, or a top.

A further feature of the present invention involves a vehicle handle cover configured to affix to a vehicle door handle wherein two or more decorative design members are affixed to a single handle overlay.

The foregoing objects may also be achieved by a vehicle handle cover comprising a handle overlay having a first and second opposite surfaces and one or more holes extending through the handle overlay from the first surface to the second surface, a decorative design member having one or more pins extending therefrom and extending through the one or more holes respectively in the handle overlay, the one or more pins each being secured within at least one of the one or more holes in the handle overlay and securing the decorative design member over the second surface of the handle overlay.

A further feature of the present invention involves a vehicle handle cover comprising a securing member on at least one pin of a design member or logo, the securing member including an enlarged or deformed portion of one or more of the pins, preventing the pins from passing through the hole each of the pins extends through in a handle overlay.

A further feature of the present invention involves a vehicle handle cover further comprising a securing member on at least one pin, each of the securing members comprising a separate member attached to the tip of each of one or more pins.

A further feature of the present invention involves a vehicle handle cover comprising an attachment material between a handle overlay and a manufacturer's door handle wherein the attachment material is selected from the group consisting essentially of tape, adhesive, bonding agent, or cured resin.

The foregoing objects may also be achieved by a method for applying a cover to a vehicle door handle comprising the steps of taking a decorative design member and affixing the decorative design member to a handle overlay, wherein the handle overlay is configured to affix to the vehicle door handle, and affixing the handle overlay to a vehicle door handle.

A further feature of the present invention involves a method for applying a cover to a vehicle door handle further comprising a step of affixing a logo to a decorative design member.

The foregoing objects may also be achieved by a method for applying a cover to a vehicle door handle comprising the steps of taking a decorative design member and affixing the decorative design member to a handle overlay, wherein the handle overlay is configured to affix to a vehicle door handle, and affixing the handle overlay to a vehicle door handle.

The foregoing objects may also be achieved by a method for applying a cover to a vehicle manufacturer's door handle comprising taking a decorative design member having one or more pins extending therefrom and an overlay having a first surface and a second surface and one or more holes extending through the overlay from the first surface to the second surface, extending each of the one or more pins of the design member through one of the one or more holes in the overlay, securing the pins within the one or more holes of the overlay, and thereby securing the decorative design member to the first surface of the overlay, and attaching an overlay with the design member secured thereto in covering relation with the manufacturer's door handle.

The current invention relates to attaching decorative design members and logos to a handle overlay for use on automobile door handles. The vehicle door handles in consideration in this application include but are not limited to handles for opening a door, a trunk, a tailgate, a hatch, a hood, a storage box, or a top.

A handle overlay is generally a device which is molded plastic or stamped metal which is designed to custom fit over an existing vehicle handle so as to fit tightly and not to interfere with the operation of the handle. The device is used for a decoration or trim to the existing vehicle handle.

The decorative design members referred to in this invention can refer to decorative designs that are either generic and do not specifically refer to specific entities, or are logos which specifically identify certain entities such as but not limited to, universities, sports teams, name brands, and the like.

BRIEF DESCRIPTION OF THE DRAWINGS

FIG. 3A shows the backside of a prior art handle overlay which is affixed to a door handle by the use of double sided tape.
FIG. 3B shows the backside of a handle overlay with holes through the handle overlay to allow for mounting of a decorative design member to the handle overlay.
FIG. 4 shows how a decorative design member mates to a handle overlay which in turn mates to an existing vehicle door handle.

DETAILED DESCRIPTION OF THE PREFERRED EMBODIMENT

Figure 1:
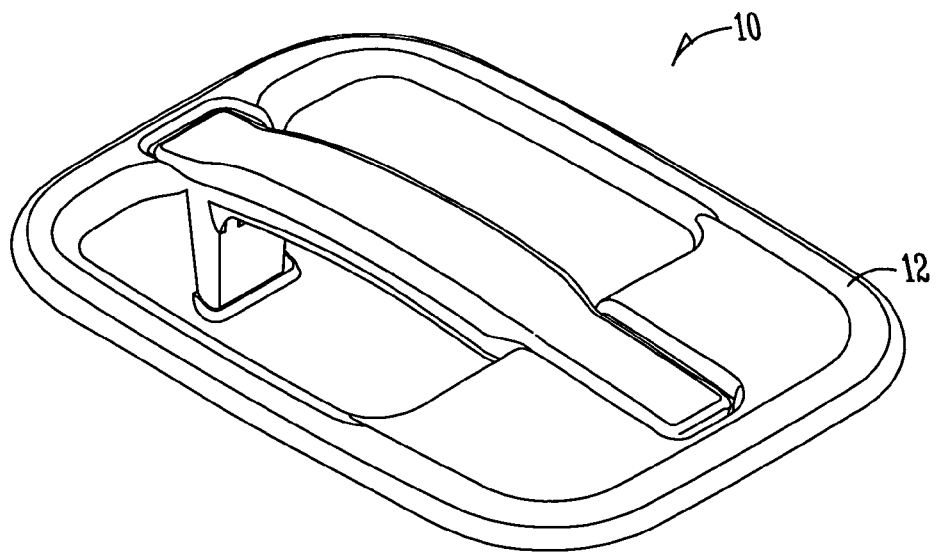
FIG. 1 shows a prior art vehicle door handle assembly.

FIG. 1 shows a typical vehicle door handle assembly 10 with a vehicle door handle 12. As discussed above, the vehicle door handle 12 contemplated by the current invention can be a handle used for opening any part of a vehicle including but not limited to the vehicle door, trunk, tailgate, hatch, hood, storage box, or a top.

Figure 2:
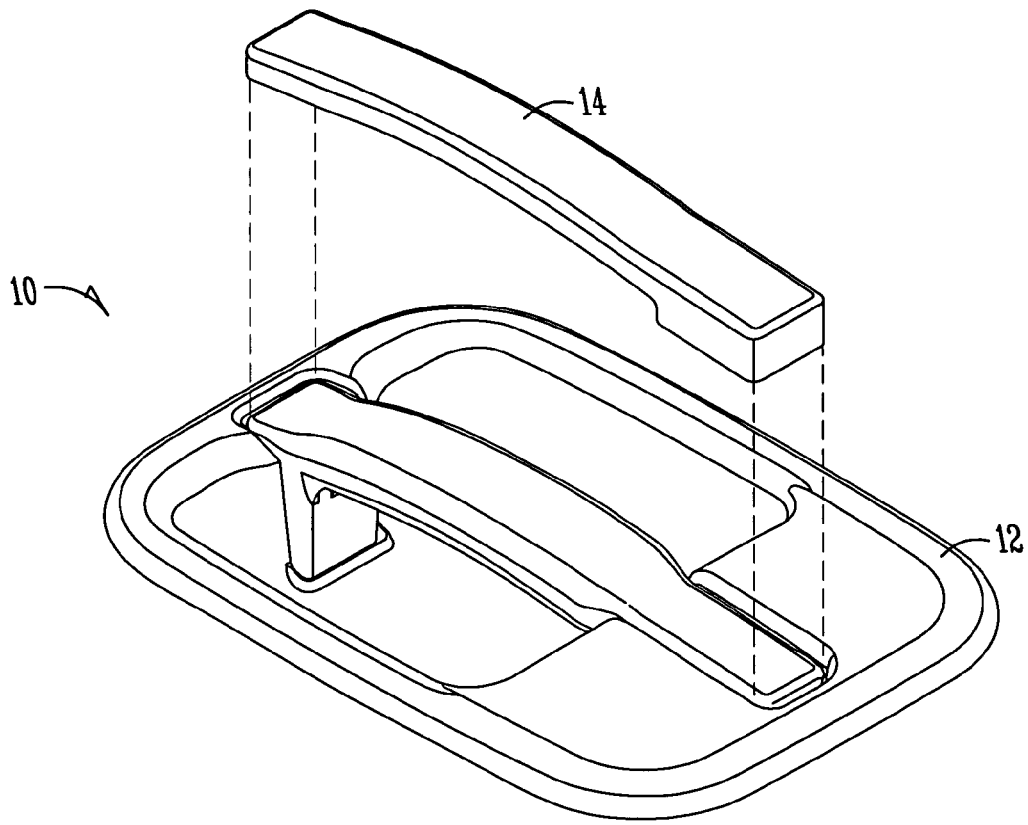
FIG. 2 shows a prior art vehicle door handle using a handle overlay.

FIG. 2 shows a vehicle door assembly 10 with the door handle 12 and a handle overlay 14, which is custom configured to mate with the specific door handle 12.

A handle overlay 14 typically mounts to door handle 12 by the use of double-sided tape 32 shown in FIG. 3A.

Figure 5:
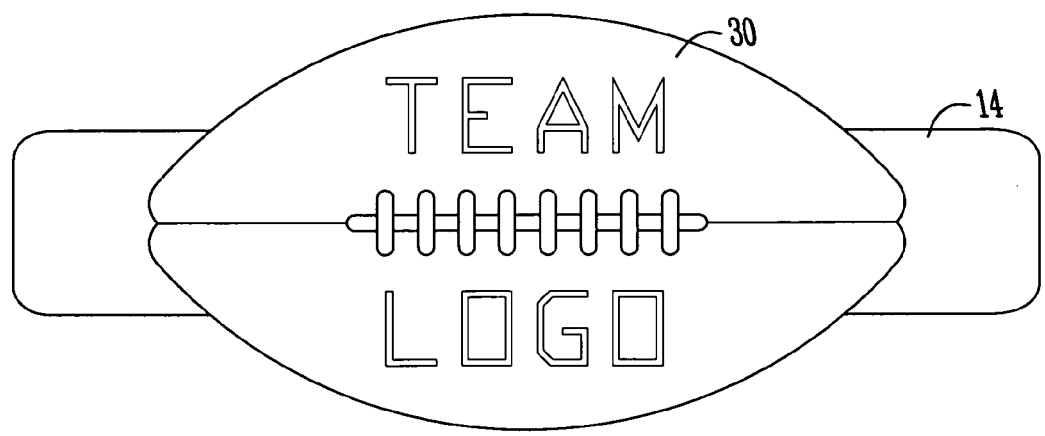
FIG. 5 shows a decorative design member configured as a logo affixed to a handle overlay.

One embodiment of the current invention is shown in FIG. 4. FIG. 4 shows a decorative design member 30 configured as a logo and further configured to affix to a handle overlay 14. Once the decorative design member 30 is affixed to a handle overlay 14 it appears as it does in FIG. 5. Once again, the decorative design member configured as a logo can be any recognizable symbol which relates to things such as but not limited to universities, sports teams, name brands, or the like.

Figure 6A:
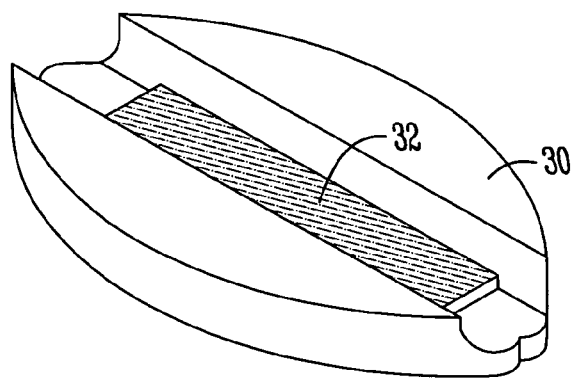
FIG. 6A shows a backside of a decorative design member which affixes to a handle overlay with double-sided tape.

One preferred method of affixing the decorative design member 30 to the handle overlay 14 is to use double-sided tape 32 between the decorative design member 30 and the handle overlay 14 as is commonly used in attaching or affixing trim to vehicles. It is also preferred that the decorative design member 30 of the current invention be configured so as to mate with the curvature or shape of the handle overlay 14. This can be seen in FIG. 6A where the backside of the decorative design member 30 is shown. The decorative design member 30 is molded or cutout in such a way that allows the decorative design member 30 to nest against the handle overlay 14 so as to reduce open space between the junction of the decorative design member 30 and the handle overlay 14 to create a tighter more positive fit. In this way, the double-sided tape 32 is able to contact more surface area of both the backside of the decorative design member 30 and the handle overlay 14 to create a stronger affixation of the decorative design member 30 to the handle overlay 14.

Figure 6B:
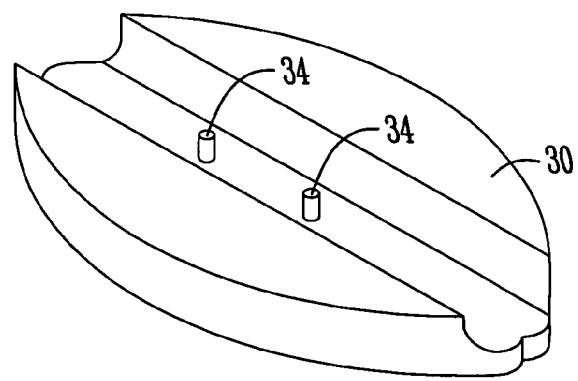
FIG. 6B shows a backside of a decorative design member which affixes to a handle overlay with pins.

Another preferred way to affix a decorative design member 30 to a handle overlay 14 is shown in FIG. 6B. This method of affixing the decorative design member 30 to the handle overlay 14 calls for one or more mounting pins 34 to extend from the backside of the decorative design member 30. The mounting pins are designed in such a way so as to extend through one or more mounting pin holes 16 as shown in FIG. 3B. The mounting pins 34 can be created from metal, plastic, or other rigid or semi-rigid material. In addition, the mounting pins 34 can be created as an extension or one piece with the decorative design member 30. Alternatively, the mounting pins 34 can be inserted into the decorative design member 30 so as to stay connected with the backside of the logo. In addition, a decorative design member 30 can be molded around mounting pins 34.

In the mounting pin 34 method of affixing the decorative design member 30 to the handle overlay 14, the mounting pins 34 are to be inserted through the mounting pin holes 16 so that the mounting pins 34 extend through the backside of the handle overlay 14. Then, the mounting pins 34 can be hammered, machined, bent over, melted down, or other method of enlarging or deforming the mounting pins 34 so that they can no longer pass back through the mounting pin holes 16 in the handle overlay 14. This creates a rigid affixation of the decorative design member 30 to the handle overlay 14. In addition to the foregoing, a decorative design member 30 can be affixed to a handle overlay 14 by adhesive, glue, bonding agent, cured resin, fusing, welding, screws, bolts, pins, rivets, and any other method of rigidly or semi-rigidly affixing one body to another.

Figure 7:
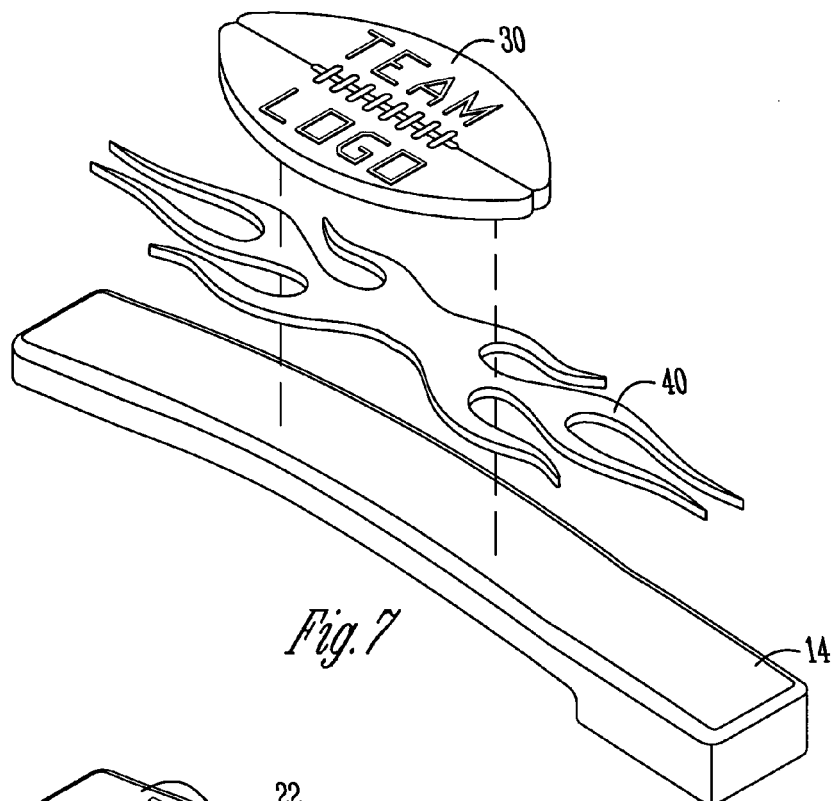
FIG. 7 shows a decorative design member configured as a logo attached to a generic decorative design member.

Similarly, a generic decorative design member 40 as seen in FIG. 7, can be affixed to a handle overlay 14. A generic decorative design member 40 is a decorative design which does not specifically point to a certain product or endorsement as a decorative design member configured as a logo 30 does. A generic decorative design member 40 can be affixed to a handle overlay 14 in the same methods as described above.

In addition, a decorative design member configured as a logo 30 can be affixed to a generic decorative design member 40 as described above, which can then in turn be affixed to a handle overlay 14.

In summation, a decorative design member configured as a logo 30 can be affixed directly to a handle overlay 14, a generic decorative design member 40 can be affixed directly to a handle overlay 14, or a decorative design member configured as a logo 30 can be affixed to a generic decorative design member 40 which can then be affixed to a handle overlay 14. Once again, a preferred method of affixing a logo, decorative design member and handle overlay together is double-sided tape 32 or mounting pins 34 which mount through mounting pin holes 16. However, any other method of affixing the parts together can be used.

Figure 8:
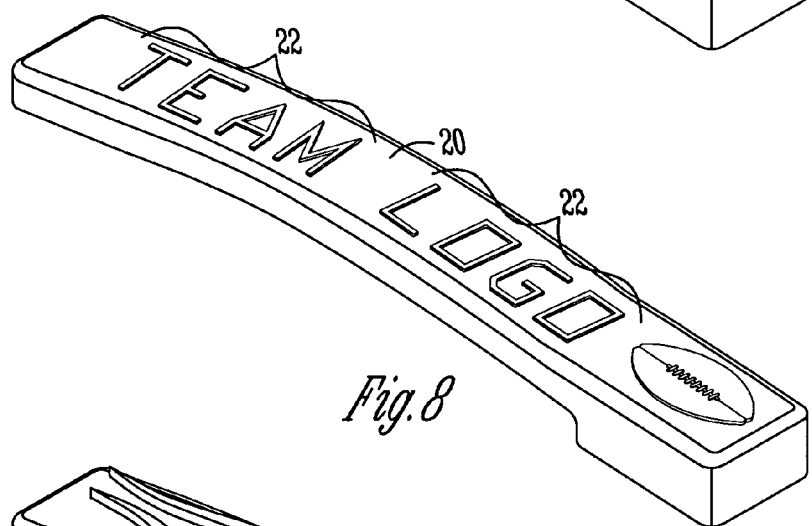
FIG. 8 shows a handle overlay in which a decorative design member which is configured as a logo is integral with a handle overlay.

Another embodiment of the current invention is shown in FIG. 8. The integral decorative design member configured with a logo 22 is integrated into an integrated handle overlay 20. In other words, the decorative design member configured with an integral-logo 22 is integrated into the handle overlay by either being molded as one part with the handle overlay 20 or by being fused together by a means such as melting together, ultrasonic welding, or other similar type fusing methods.

Figure 9:
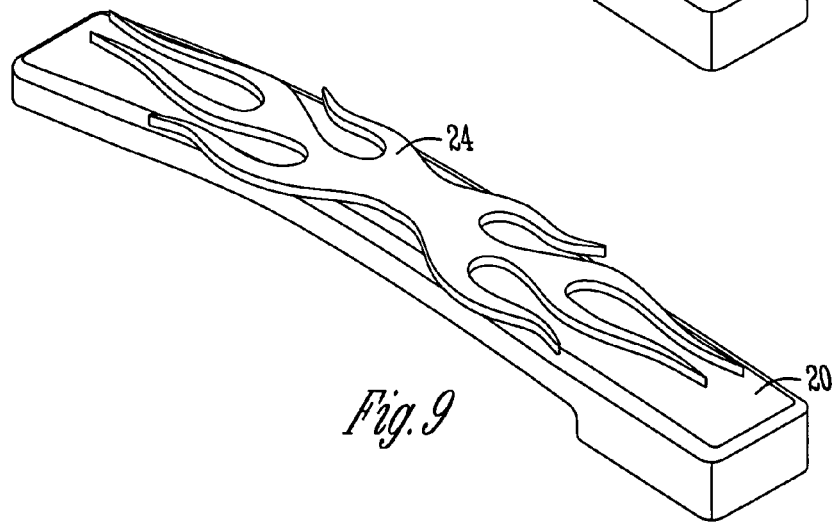
FIG. 9 shows a handle overlay in which a generic decorative design member is integral with a handle overlay.

In addition to having a decorative design member configured as a logo 22 integrated with a handle overlay 20, the invention can also have a generic integral decorative design member 24 integrated with a handle overlay 20 as in FIG. 9.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A vehicle handle cover for covering a vehicle handle having an outer top surface, opposite sides, and opposite ends, the cover comprising:

a non-flexible handle overlay adapted to affix to the door handle and be fixed against movement relative to the door handle wherein the overlay includes a channel with an inside surface and opposite sides to matingly engage the outer top surface and opposite sides of the door handle; and a decorative design member affixed to the handle overlay.

2. The vehicle handle cover of claim 1 wherein the decorative design member is a logo.

3. The vehicle handle cover of claim 1 wherein the handle overlay is affixed to the existing vehicle door handle by a connecting member selected from the group consisting essentially of: double-sided tape, adhesive, glue, bonding agent, cured resin, fusing, welding, screws, bolts, pins, and rivets.

4. The vehicle handle cover of claim 1 wherein the decorative design member is affixed to the handle overlay by a connecting member selected from the group consisting essentially of: double-sided tape, adhesive, glue, bonding agent, cured resin, fusing, welding, screws, bolts, pins, and rivets.

5. The vehicle handle cover of claim 1 having two decorative design members affixed to the handle overlay.

6. The vehicle handle cover of claim 1 wherein the handle overlay covers a majority of an exterior portion of the vehicle door handle.

7. The vehicle handle cover of claim 1 wherein the overlay has a top surface and opposite sides and the design member has a channel with an inside surface and opposite sides to matingly engage the top surface and opposite sides of the overlay.

8. The vehicle handle cover of claim 1 wherein the design member has pins extending through holes in the overlay to mount the design member to the overlay.

9. The vehicle handle cover of claim 1 wherein the design member, overlay and handle are in a matingly engaging layered arrangement.

10. A vehicle handle cover for covering a vehicle handle comprising:

a handle overlay adapted to mount over the handle so as to substantially cover the handle and be fixed against movement relative to the handle, and having one or more holes extending through the handle overlay, wherein the overlay includes a channel with an inside surface and opposite sides to matingly engage an outer top surface and opposite sides of the door handle; and a decorative design member having one or more pins extending through the one or more holes, respectively, in the handle overlay to secure the design member to the overlay.

11. The vehicle handle cover according to claim 10 and further comprising a securing member on at least one of the pins, the securing members including an enlarged or deformed portion of one or more of the pins, preventing the pins from passing through the hole each of the pins extends through in the handle overlay.

12. The vehicle handle cover according to claim 10 comprising an attachment material between the handle overlay and the manufacturer's door handle wherein the attachment material is selected from the group consisting essentially of: tape, adhesive, bonding agent, or cured resin.

13. The vehicle handle cover of claim 10 wherein the overlay has a top surface and opposite sides and the design member has a channel with an inside surface and opposite sides to matingly engage the top surface and opposite sides of the overlay.

14. The vehicle handle cover of claim 10 wherein the design member, overlay and handle are in a matingly engaging layered arrangement.

* * * * *